US007744281B2

(12) United States Patent
Fuerst et al.

(10) Patent No.: US 7,744,281 B2
(45) Date of Patent: Jun. 29, 2010

(54) METHOD AND DEVICE FOR MONITORING THE OPERATION OF A PLAIN BEARING

(75) Inventors: Axel Guenter Albert Fuerst, Gebenstorf (CH); Kamil Matyscak, Brenden Uehlingen Birkendorf (DE)

(73) Assignee: ALSTOM Technology Ltd., Baden (CH)

( * ) Notice: Subject to any disclaimer, the term of this patent is extended or adjusted under 35 U.S.C. 154(b) by 1140 days.

(21) Appl. No.: 10/470,531

(22) PCT Filed: Feb. 1, 2002

(86) PCT No.: PCT/IB02/00385

§ 371 (c)(1),
(2), (4) Date: Oct. 14, 2003

(87) PCT Pub. No.: WO02/061297

PCT Pub. Date: Aug. 8, 2002

(65) Prior Publication Data

US 2004/0055825 A1 Mar. 25, 2004

(30) Foreign Application Priority Data

Feb. 2, 2001 (DE) ................................ 101 04 697

(51) Int. Cl.
*F16C 17/00* (2006.01)
*F16C 33/10* (2006.01)
*F01M 1/18* (2006.01)
*F01M 11/10* (2006.01)

(52) U.S. Cl. ................................ 384/8; 384/13; 184/6.4

(58) Field of Classification Search ..................... 384/8, 384/13, 42, 322, 377, 399, 100; 184/6.1, 184/6.4
See application file for complete search history.

(56) References Cited

U.S. PATENT DOCUMENTS 3,053,589 A * 9/1962 Cameron .................... 384/118
3,548,396 A 12/1970 Roberts
3,658,393 A * 4/1972 Luthi .......................... 384/12
3,674,112 A * 7/1972 Roberts ...................... 184/6.1
4,351,574 A * 9/1982 Furukawa et al. .............. 384/8
4,696,585 A * 9/1987 Swearingen ................ 384/399

(Continued)

FOREIGN PATENT DOCUMENTS

DE 883 984 7/1953

(Continued)

OTHER PUBLICATIONS

Search Report from DE 101 04 697.9 (Sep. 21, 2001).

*Primary Examiner*—Thomas R Hannon
*Assistant Examiner*—Justin Krause
(74) *Attorney, Agent, or Firm*—Cermak Nakajima LLP; Adam J. Cermak

(57) ABSTRACT

In a method of monitoring the operation of a plain bearing, a lubricant passage (15) of a bearing segment, this lubricating passage (15) being provided for jacking oil for example, is used during hydrodynamic operation of the plain bearing for extracting samples for a temperature measurement. For producing the measuring operation, a switch-over device (19) clears a flow path from the lubricant passage (15) into an outflow passage (23) in such a way that lubricant from the lubricating film (13) flows through the lubricant passage, the temperarature of this lubricant being determined by a temperature sensor (16, 18).

5 Claims, 1 Drawing Sheet

U.S. PATENT DOCUMENTS 5,063,322 A * 11/1991 Sugita et al. ................ 310/341
5,145,322 A 9/1992 Senior, Jr. et al. ............. 417/32
5,364,190 A * 11/1994 Ochiai et al. ................ 384/100
5,447,375 A * 9/1995 Ochiai et al. ................ 384/100
5,769,545 A * 6/1998 Bently et al. ................ 384/118
5,894,868 A 4/1999 Wuester, Sr. ................... 141/4
6,547,438 B2 * 4/2003 Shima ........................ 384/100

FOREIGN PATENT DOCUMENTS

| | | |
|---|---|---|
| DE | 2909342 | 9/1979 |
| EP | 0 161 644 B1 | 9/1990 |
| JP | 61149611 | 8/1986 |
| WO | 98/25039 | 6/1998 |

* cited by examiner

METHOD AND DEVICE FOR MONITORING THE OPERATION OF A PLAIN BEARING

FIELD OF THE INVENTION

The present invention relates to a method of monitoring the operation of a plain bearing and to a plain bearing which is especially suitable for implementing the invention.

DISCUSSION OF BACKGROUND

In a hydrostatic or hydrodynamic plain bearing, in which the actual support is carried out by a formed thin lubricating film consisting of a fluid (e.g. of an oil), a measurement of the temperature of the lubricant in the lubricating film or a temperature measurement in the adjacent sliding surfaces provides information about the state of the bearing and is therefore especially suitable for monitoring the operation.

Thus it is known from EP 0 161 644, in a plain bearing for the early detection of damage, to monitor the temperature in the region of the sliding layer in order to be able to take countermeasures in good time in the event of a noticeable increase in temperature. In this case, however, a change in the lubricant temperature is recorded with a considerable time delay and only indirectly. Even if the temperature sensor were to be run directly to the surface or sliding surface, the temperature of the bearing segment at best would be measured. The lubricant or fluid temperature may locally be markedly above this, since 90-97% of the heat generated in the fluid is dissipated by the fluid itself, that is to say past the temperature sensor; only 5% of the heat in terms of the order of magnitude is directed through the bearing segment.

A direct measurement of the lubricant temperature in the lubricating film is not known in the prior art. The problem with the direct measurement is that the film, for example in the case of oil as lubricant, is only 20 μm to about 200 μm thick, so that no probes can be fitted. German Patent 883 984 specifies a bearing design for rolling mills which is supplied with an excess lubricant quantity for cooling, which is larger than the lubricant quantity which is to penetrate into the lubricating gaps. The excess quantity is drawn off from fresh-oil chambers through a return line. German Patent 883 984 proposes to arrange a temperature sensor in this return line in order to determine the temperature of the bearing surface. In this case, however, there is on the one hand the risk of the measurement being distorted by feed lubricant; on the other hand, the proposed measuring method can only be used in special bearings which are operated with excess oil. Furthermore, there are considerable uncertainties when drawing conclusions about the temperature in the bearing gap, since of course the measured medium does not originate explicitly from the bearing gap.

SUMMARY OF THE INVENTION

The object of the invention is to provide a method of monitoring the temperature in a plain bearing working with a lubricating film, in particular in a hydrodynamic plain bearing, which method avoids the disadvantages of the prior art and in particular permits largely direct and accurate monitoring of the lubricant temperature in the bearing gap, and requires the minimum possible modifications of existing bearings. Furthermore, a plain bearing is to be specified which, with little design outlay, permits as direct a measurement of the lubricant temperature as possible and requires as far as possible no extensive redesign of existing bearings or bearing segments.

Large plain bearings especially are often composed of a plurality of bearing segments. Within the scope of the present invention, the idea behind the invention is in no way affected by whether the invention is implemented on a segmented plain bearing or on a plain bearing without segments. Therefore the reference to one of the terms below also includes the other, which is readily apparent to the person skilled in the art.

One of numerous aspects of the present invention involves bringing the temperature sensor for the measurement directly into contact with lubricant from the lubricating film by lubricant being extracted from the lubricating film and by the temperature of the extracted lubricant being measured by the temperature sensor directly after the extraction. This is achieved by virtue of the fact that a lubricant passage, such as a lubricant passage of a jacking-oil arrangement, which during the hydrodynamic operation of the bearing is not required or is not permanently required for feeding lubricant, is temporarily or permanently operated by suitable switch-over means as an outflow passage for a partial flow of the lubricant from the lubricating film. In this case, the extraction flow, on the one hand, is to be kept so small that the pressure build-up in the lubricating film is not disturbed; on the other hand, the extraction flow must be large enough in order to keep a temperature change small which is due to heat losses to the bearing segment, so that the temperature is "brought" from the lubricating film to the temperature sensor as far as possible without being distorted. The extraction flow is preferably set by a correspondingly arranged, preferably adjustable, choke point. For undisturbed functioning of the plain bearing, it is advantageous in this case if the quantity of lubricant extracted from the lubricating film is kept so small that the lubricating film does not change substantially; the extraction quantity is therefore preferably less than 5%, in particular less than 2% or even markedly less than 1% of the entire lubricant quantity fed to the bearing for the hydrodynamic operation; nonetheless: the smaller the quantity extracted, the more sluggish is the reaction of the measurement.

A further preferred configuration of the method according to the invention is characterized by the fact that the pressure in the lubricant passage is measured while the method is being carried out. The rate of flow through a variable choke point is then varied as a function of the measured pressure. Alternatively or additionally, the switch-over means may be activated as a function of the measured pressure in such a way that, depending on the measured lubricant pressure, the feed of the lubricant to the lubricating film or the extraction of the lubricant from the lubricating film is released.

A plain bearing according to the invention or a plain bearing segment is characterized by the fact that a lubricant passage opens out on a sliding surface of the plain bearing, the lubricant passage being connected at an end opposite this orifice to a suitable switch-over means, via which the lubricant passage can be optionally switched to a feed line for lubricant, for example from a high-pressure lubricating system, in particular of a jacking-oil arrangement, and to an outflow line for lubricant. In addition, the term "plain bearing", as described above, also relates to individual plain bearing segments. In particular, it is advantageous if a temperature sensor for determining the lubricant temperature, in particular a thermocouple or a PT 100 temperature sensor, extends into the lubricant passage. For a measurement which is as precise and as quick as possible, the temperature sensor, from the design point of view, is arranged as close to the orifice of the lubricant passage as possible. To limit and/or set the extraction flow, a preferably adjustable choke device is arranged in the outflow line for the lubricant.

In a further embodiment of the plain bearing, a pressure-measuring point is arranged in the lubricant passage, the signal from this pressure-measuring point preferably being directed via at least one controller to the switch-over means and/or to an adjustable choke device arranged in the outflow line for lubricant and/or to a lubricating or pressure oil system.

The bearing according to the invention is distinguished by its simplicity, since lines which are present anyway internally and which are not required for their actual use in all the operating states are used for extracting a measuring fluid from the bearing, the temperature sensor being arranged in a protected manner in the interior of the bearing or of the bearing segment. Design changes to existing bearings or bearing segments are restricted to a minimum and do not interfere with the functioning. In this respect, existing designs may also be retrofitted according to the invention without excessive outlay.

BRIEF DESCRIPTION OF THE FIGURES

The invention is to be explained in more detail below with reference to the drawing. The single FIGURE shows a bearing segment according to the invention in a schematic sectional representation; the following explanations and the drawing serve only for the better understanding of the invention and are only to be understood in an instructive sense and not in a restrictive sense.

WAYS OF IMPLEMENTING THE INVENTION

Figure 1:
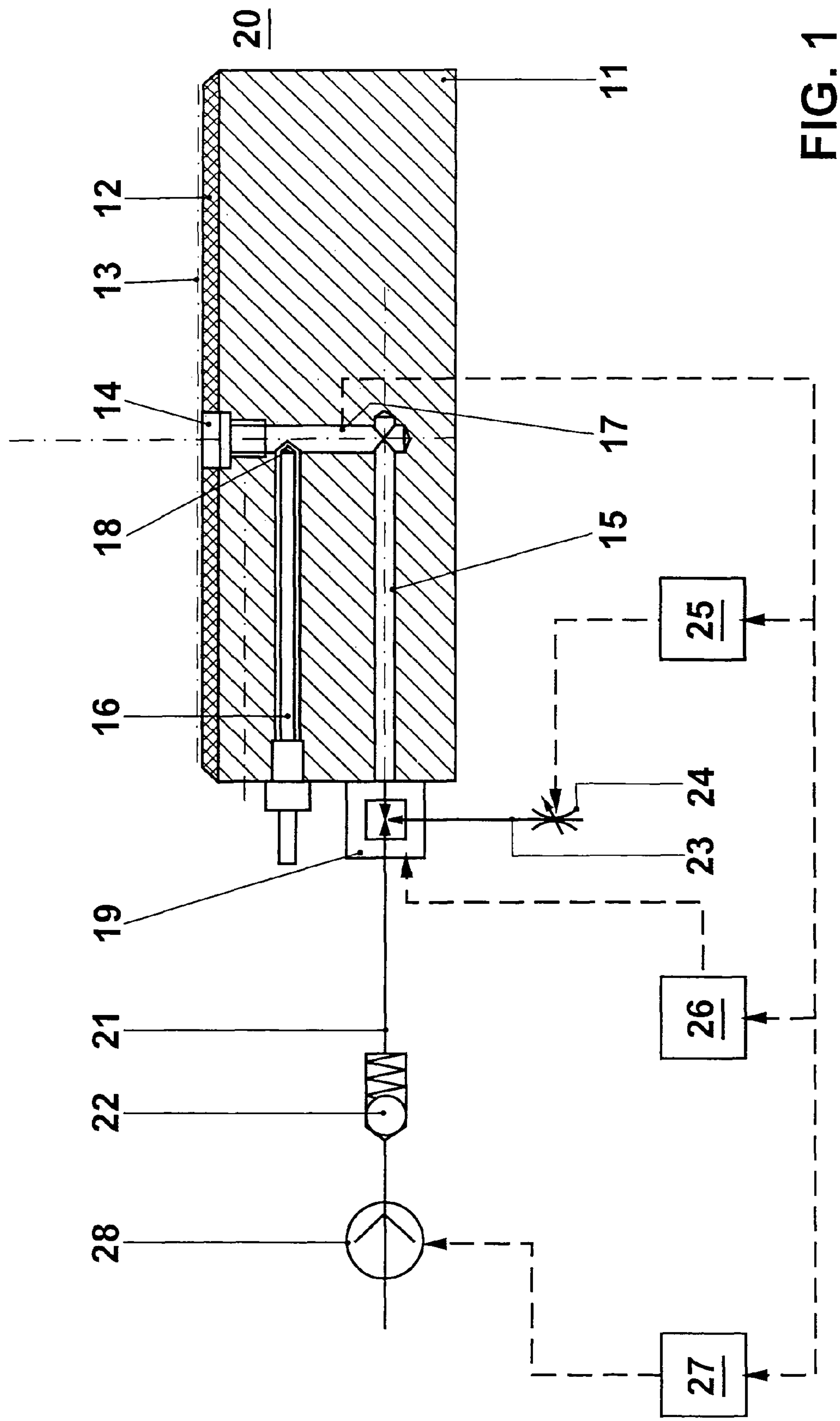

Reproduced in the FIGURE is a bearing segment of a hydrodynamic plain bearing having temperature monitoring of the lubricating film according to a preferred embodiment of the invention. A hydrodynamic plain bearing 20 in the FIGURE consists of a plurality of bearing segments, of which only the bearing segment 11 is shown, which is provided with a high-pressure lubricating system, for example of a jacking-oil arrangement, which is only partly indicated by the pump 28. Such bearing segments are arranged in particular in a bottom region of a bearing. At low speeds of a shaft mounted in the bearing, a sufficient hydrodynamic lubricating film still cannot be built up. Such a jacking-oil arrangement is therefore used especially in the case of heavily weighted bearings. Before the shaft is started up, lubricant, when the shaft is at rest, is forced by the high-pressure pump 28 through the lubricant passage 15 into the bearing gap (not shown) and, in the ideal case, lifts the load to be carried completely from the sliding surface 12. After that, the shaft is successively set in motion. In this case, the orifice 14 of the lubricant passage is designed in such a way that a lubricating film 13 wetting the bearing surface as completely as possible is built up in such a way that the emergency running properties of a sliding layer 12 are not called for. With increasing speed of a shaft mounted in a hydrodynamic plain bearing, a sufficiently high pressure builds up in the lubricating gap so that the bearing load can be carried solely by the hydrodynamic lubricating film formed. This pressure frequently exceeds that which can be reasonably applied by a pump; a check valve 22 is therefore arranged in the feed line 21 for the lubricant; and furthermore, for example, a pressure-relief device known per se could be arranged between the check valve 22 and the pump 28 in order to protect the pump from overload. During hydrodynamic operation of the bearing, the lubricant passage 15 is therefore no longer required for its actual task. According to the invention, a sample flow from the bearing gap is therefore admitted to the lubricant passage. To this end, a switch-over valve 19 is arranged at the lubricant passage 15, by means of which switch-over valve 19 the lubricant passage can be optionally switched to the lubricant feed line 21 and an outflow line 23. If hydrodynamic operation is therefore ensured, the switch-over valve 19 is thus switched in such a way that lubricant flows. off from the lubricating film 13 into the outflow line 23. A temperature sensor 16 is arranged in such a way that it extends with its actual measuring point 18 into the lubricant passage; in this case, this measuring point is preferably arranged as close to the orifice 14 of the lubricant passage 15 as possible from the design point of view. In this way, the temperature sensor 16 determines the temperature of the lubricant coming from the lubricating film 13, this temperature, in the design selected, corresponding very accurately to the temperature of the lubricating film 13. The extracted quantity in this case must be small enough in order to not effectively disturb the lubricating film; on the other hand, it should be large enough for the measurement to be effected in a relevant and precise manner. The extracted quantity is set via a, preferably variable, choke device 24 arranged in the outflow line 23. In a simple case, the position of the switch-over valve 19 is controlled, for example, via the shaft speed in such a way that, up to a first speed, lubricant flows from the feed line 21 into the lubricant passage 15, and, above this speed, the flow path from the lubricant passage to the outflow line 23 is cleared. In the example shown, another control means has been selected. A pressure-measuring point 17 is arranged in the lubricant passage 15. A pressure measured there is used as a reference variable for a number of control interventions. In this case, the pressure in the lubricating passage, in the embodiment shown, is controlled in three control domains. In a first control domain, which is placed within a lowest pressure range, a pressure signal from the measuring point 17 acts via the controller 27 on the high-pressure lubricating system or the pump 28, respectively. In the process, the flow path from the feed line 21 to the lubricant passage 15 is cleared in the switch-over valve. In a second control domain, the switch-over valve 19 is actuated via the controller 26 as a function of the measured pressure, the controller 26 preferably being a two-point controller: the flow path from the lubricant passage 15 to the outflow line 23 is cleared above a first pressure limit value; the conduction of the lubricant is thus switched over to the measuring operation. A reversed switching operation is effected at a second pressure limit value which is lower than the first pressure limit value. By the hysteresis of the switching points which is thus implemented, uncontrolled switching back and forth is avoided. During the measuring operation, the choke device 24 is set within a lowest pressure range to a predetermined minimum rate of flow. The third control domain is effective at a higher pressure, and, via the controller 25, the pressure in the lubricant passage 15 is set via the rate of flow through the choke point 24.

The configuration according to the invention and the method according to the invention result in sensitive and exact monitoring of the operation of the plain bearing. Incipient bearing damage, which is preceded by a rise in the lubricant temperature in the lubricating film 13, is immediately recorded.

LIST OF DESIGNATIONS

11 Bearing segment
12 Sliding layer
13 Lubricating film
14 Orifice, lubricant outlet
15 Lubricant passage

16 Temperature sensor
17 Pressure-measuring point, pressure sensor
18 Measuring point of the temperature sensor
19 Switch-over means, switch-over valve
20 Plain bearing
21 Feed line
22 Check valve
23 Outflow line
24 Choke device
25 Controller
26 Controller
27 Controller
28 Lubricating system, high-pressure lubricating system, jacking-oil arrangement, pump

What is claimed is:

1. A plain bearing or a plain bearing segment, comprising:

a bearing body having a side;

a sliding surface at said bearing body side;

a lubricant outlet orifice in the sliding surface;

a lubricant passage within said bearing body, said lubricant passage having a first end and a second end, said lubricant passage opening out in the sliding surface at the lubricant outlet orifice at said first end;

switch-over means at said second end of said lubricant passage for selectively connecting the lubricant passage at said second end to a feed line for lubricant and to an outflow line for lubricant; and a temperature sensor within said bearing body extending into the lubricant passage adjacent to the lubricant outlet orifice.

2. The plain bearing or plain bearing segment as claimed in claim 1, further comprising:

the lubricant outflow line, in fluid communication with the switch-over means; and an adjustable choke device arranged in the lubricant outflow line.

3. The plain bearing or plain bearing segment as claimed in claim 1, further comprising a pressure-measuring point arranged in the lubricant passage.

4. The plain bearing or plain bearing segment as claimed in claim 3, further comprising:

at least one controller; and wherein the plain bearing or plain bearing segment is configured and arranged to direct a signal from the pressure-measuring point via the at least one controller to a device selected from the group consisting of the switch-over means, an adjustable choke device arranged in the outflow line for lubricant, a lubricating system, and combinations thereof.

5. The plain bearing or plain bearing segment as claimed in claim 1, further comprising:

the lubricant outflow line, in fluid communication with the switch-over means; and the feed line for lubricant, in fluid communication with the switch-over means.

* * * * *